US007725574B2

(12) United States Patent
O'Connell et al.

(10) Patent No.: US 7,725,574 B2
(45) Date of Patent: May 25, 2010

(54) WEB BROWSER-BASED PROGRAMMING LANGUAGE ERROR DETERMINATION AND REPORTING

(75) Inventors: Brian Marshall O'Connell, Cary, NC (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 11/337,744

(22) Filed: Jan. 23, 2006

(65) Prior Publication Data

US 2007/0174419 A1     Jul. 26, 2007

(51) Int. Cl.
G06F 15/16 (2006.01)
(52) U.S. Cl. .................................. 709/224; 709/219
(58) Field of Classification Search ............... 714/38; 709/216, 218, 224; 717/115
See application file for complete search history.

(56) References Cited

U.S. PATENT DOCUMENTS

| | | | | |
|---|---|---|---|---|
| 5,673,386 | A * | 9/1997 | Batra | 714/38 |
| 5,974,444 | A * | 10/1999 | Konrad | 709/203 |
| 5,987,611 | A | 11/1999 | Freund | |
| 6,035,119 | A | 3/2000 | Massena et al. | |
| 6,925,497 | B1 | 8/2005 | Vetrivelkumaran et al. | |
| 7,237,023 | B2 * | 6/2007 | Menard et al. | 709/224 |
| 2001/0032248 | A1 | 10/2001 | Krafchin | |
| 2002/0087969 | A1 | 7/2002 | Brunherato et al. | |
| 2002/0099818 | A1 * | 7/2002 | Russell et al. | 709/224 |
| 2003/0005110 | A1 * | 1/2003 | Corbin et al. | 709/224 |
| 2006/0047780 | A1 * | 3/2006 | Patnude | 709/219 |
| 2006/0265662 | A1 * | 11/2006 | Gertzen | 715/760 |

FOREIGN PATENT DOCUMENTS

JP         08331210 A    * 12/1996

OTHER PUBLICATIONS

Active data objects & ASP, Mark Betz, Dr. Dobb's Journal, May 1998.*
Building Rich Web Applications with AJAX, Linda Dailey Paulson, IEEE Computer Sociiety, Oct. 2005.*
Decrypting JavaScript, Kane Chambers, Application Development Advisor, Aug. 2000.*
Fuel for the Web, Aaron Ricadela, InformationWeek, Jul. 2005.*

(Continued)

Primary Examiner—Ashok B Patel
Assistant Examiner—Joseph Gazda
(74) Attorney, Agent, or Firm—Robert H. Frantz; William H. Steinberg; David A. Mims, Jr.

(57) ABSTRACT

Web pages transmitted from a server to a web browser have at least two scripts and an AJAX-technique web page update command monitoring and collecting script error conditions, and for data exchange between the browser and a server to dynamically update the web pages without interruption of interaction flow caused by a full page refresh action. An browser AJAX engine executes the update commands, intercepts script calls to the server, converts the calls to HTTP requests, receives XML data from the server, and delivers corresponding web page and cascading style sheets to the browser for display and interpretation, using a background channel asynchronous connection to send a non-cacheable error message to an error processing server.

18 Claims, 7 Drawing Sheets

OTHER PUBLICATIONS

Paulson-L-D., "Building rich web applications with Ajax", Computer, {Computer-USA}, Oct. 2005, vol. 38, No. 10, p. 14-17.*

Ricadela-A., "Fuel for the Web", InformationWEEK, {InformationWEEK-USA}, Jul. 4, 2005, No. 1046, p. 18-20.*

Jesse James Garrett, Adaptive Path, "Ajax: a New Approach to Web Applications," Feb. 18, 2005, downloaded from http://www.adaptivepath>>ajax:a new approach to web applications, on Nov. 28, 2005.

Steve Champeon, "JavaScript: How Did We get Here?" downloaded from O'Reilly Network, http//www.oreillynet.com/pub/ajavascript/2001/04/05/js_history on Dec. 5, 2005.

AJAX, Whatis.com, www.whatis.comdefinitions downloaded on Dec. 5, 2005.

* cited by examiner

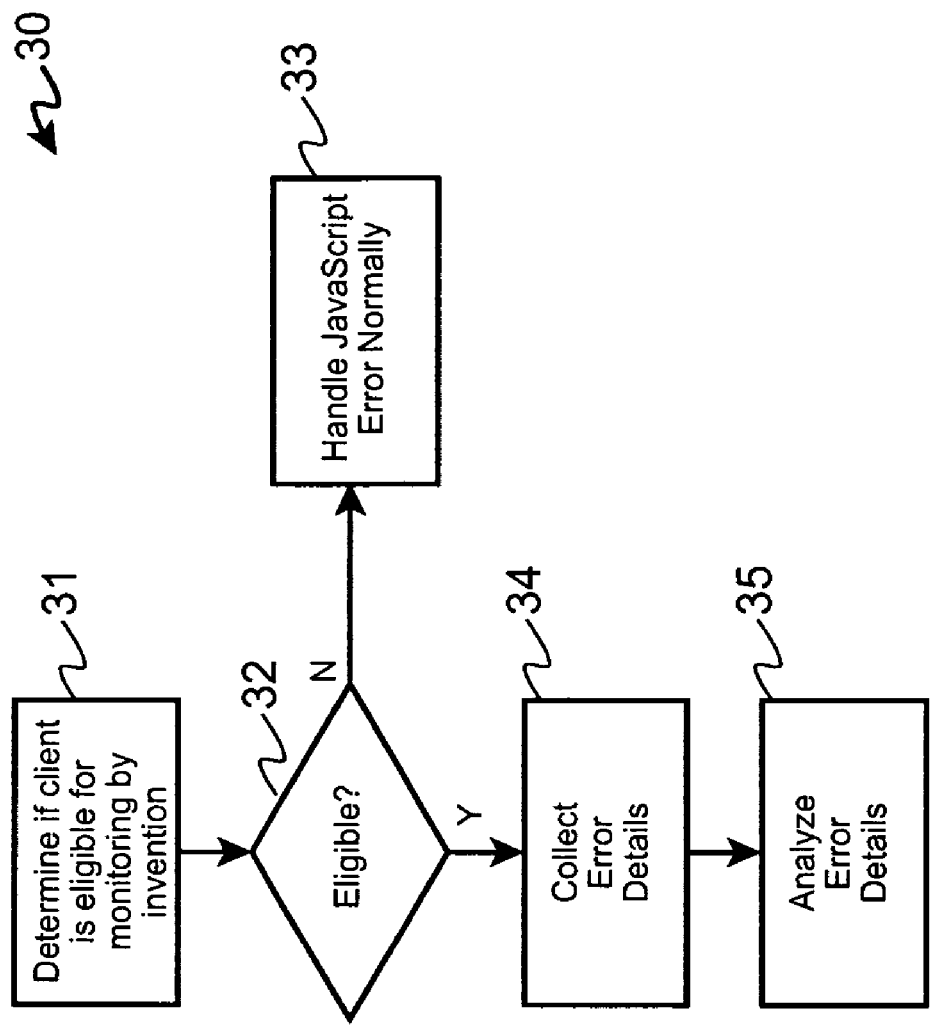

WEB BROWSER-BASED PROGRAMMING LANGUAGE ERROR DETERMINATION AND REPORTING

BACKGROUND OF THE INVENTION

1. Field of the Invention

This invention relates to technologies for reporting and collecting s, program failures, and related data from JavaScript-enabled client devices.

2. Background of the Invention

JavaScript™, a simple but powerful and popular web browser-based programming language from Netscape™ and Sun Microsystems™, is well known throughout the web programming industry. Other variations of this language, including the European Computer Manufacturers Association's ("ECMA") ECMAScript™, and Microsoft Corporation's JScript™, include similar functionality with relative ease of use compared to other programming languages. For example, later versions of JavaScript™ have incorporated functionality previously available in more advanced, and more difficult to use, languages, such as associative arrays, loosely typed variables, and regular expressions from PERL; clean, block-parsed syntax, objects and classes, highly evolved date, math, and string libraries from C/C++ and Java; and functionality of the W3C Document Object Model ("DOM"). JavaScript™ is supported by most of the latest browsers, including Mozilla™, Netscape 6™, Internet Explorer 6™ for Microsoft Windows™ and Internet Explorer 5™ for Macintosh™. For the purposes of this disclosure, we will refer to these type of programming languages and programs collectively as "web browser-based programming languages", or WBPL.

However, WBPL code may not work for all users due to differing browser implementations of WBPL. WBPL's can reduce or impair functionality and experience for the user. Developers often try to determine problems prior to deploying new WBPL code by testing the WBPL on various browsers with various operating systems, but this is not a very effective method of testing literally thousands of possible combinations of computing platforms, operating systems, and browsers. For example, consider the number of computing platforms in use today which can access the internet, such as Intel™-based Personal Computers ("PC"), AMD™-based PC's, ARM™-based Personal Digital Assistant ("PDAs"), Apple's iMac™ computers, as well as a wide array of "smart phones". Then, consider the vast array of operating systems running on these devices, including various versions of Palm Computing's PalmOS™, various versions of Microsoft Windows™ (e.g. 95/98/2000/NT/XP Home/XP Professional™), various versions of Mac OS™, as well as a number of proprietary operating systems for smart phones, multiplied by literally hundreds of versions, upgrades, patch levels, and service pack combinations. Lastly, consider the large number of browsers in use, including their many versions, plug-ins, etc.

As such, simple testing of a WBPL program on a few combinations of hardware and software is rudimentary, at best. Most WBPL developers rely, instead, on post-release and post-deployment feedback from users, such as collecting information and correction suggestions, from actual users via email. This approach also doesn't work well.

For these reasons, there is a need in the art for a system and method for developers of WBPL programs to know if s are encountered in the field, and to accurately and unobtrusively collect details regarding the environment and conditions of those s, in order to overcome practical limitations of not being able to test every browser/OS/platform combination, and in order to reduce reliance upon script users to supply feedback details.

SUMMARY OF THE INVENTION

The present invention provides a system and method to automatically detect, to silently alert developers if a user has encountered a WBPL, and to unobtrusively collect pertinent environment details from the erred script, such as platform and browser version, line of execution, etc.

The invention preferably adopts an AJAX programming methodology, which is a method of creating an asynchronous connection between a web browser and web server such that data can flow in either direction without the need for web browser or web page commands such as "reload," "post," or "get."

According to a first aspect of the present invention, web pages are transmitted from a web page server to a web browser, the pages include at least two WBPL's and one or more AJAX commands. The web browser executes the WBPL's, and the AJAX commands using a client-side AJAX engine, including establishing an asynchronous connection between the web browser and a processing server. As WBPL code sections complete successfully, a non-cacheable success status message is sent by the monitoring and collecting WBPL to the processing server via the asynchronous connection. If the web browser includes onError support, a non-cacheable error status message may also be sent to confirm an error was generated, rather than infer from the absence of a success status message that such an error occurred. Currently Internet Explorer™ and the W3C standard do not include support for onError, while Firefox™ 1.0 and higher and Netscape™ 3.0 and higher do. Even with such browser, we still need the success status messages to pinpoint where the errors are occurring in the monitored WBPL.

According to one optional aspect of the present invention, the non-cacheable messages are HTTP POST messages having one or more details in a body portion of said POST message. According to another optional aspect of the present invention, an environment information message includes one or more client-side WBPL execution details such as an Internet Protocol address, a user-agent indication, a time from initial page request to a time or report received, a document object model name of the browser which was executing said WBPL, a computing platform indicator, an operating system indicator, a system language indicator, a cookie enablement indicator, a processor class indicator, a Java enablement indicator, a display size indicator, and any other information the browser allows to be sent.

According to another optional aspect of the present invention, the AJAX command files are stored separately from said web pages by said web page server.

According to another optional aspect of the present invention, one or more records of details received from the web browser are maintained, including one or more data items such as a Boolean flag indicating that the WBPL was successful, a timestamp, a function name indicating where a WBPL error occurred, a line number indicating where a WBPL error occurred, a success aggregation by WBPL identifier, a failure aggregation by WBPL identifier, a success aggregation by user identifier, a failure aggregation by user identifier, a success aggregation by computing platform identifier, a failure aggregation by computing platform identifier, a success aggregation by web browser identifier, a failure aggregation by operating system identifier, a success aggregation by user identifier, and a failure aggregation by operating system identifier.

According to yet another optional aspect of the present invention, an error threshold and trend analyzer is provided to review the details records, to determine if one or more thresholds or one or more trends are present in the details, and to produce one or more tangible and useful results such as an error report and an error alert.

BRIEF DESCRIPTION OF THE DRAWINGS

The following detailed description when taken in conjunction with the figures presented herein provide a complete disclosure of the invention.

FIG. 3 depicts a logical process according to the present invention for determining if a client is eligible for participation in the WBPL error collection process.

DESCRIPTION OF THE INVENTION

The present invention is preferably embodied as software-implemented logic and processes, cooperating between a client device, such as a web browser, and a server device, in order to collect information regarding client-side WBPL errors and operational environment conditions. It will readily recognized by those skilled in the art that some or all of the following logic of the invention may alternatively be realized as electronic circuitry, such as application specific integrated circuits or programmable logic devices.

System Architecture

The preferred embodiment of the invention includes two cooperating portions:
  (a) a portion which determines if a particular client device or user is participating in WBPL error collection; and
  (b) a portion which collects and reports certain information useful to perform determination of the error.

Figure 1:
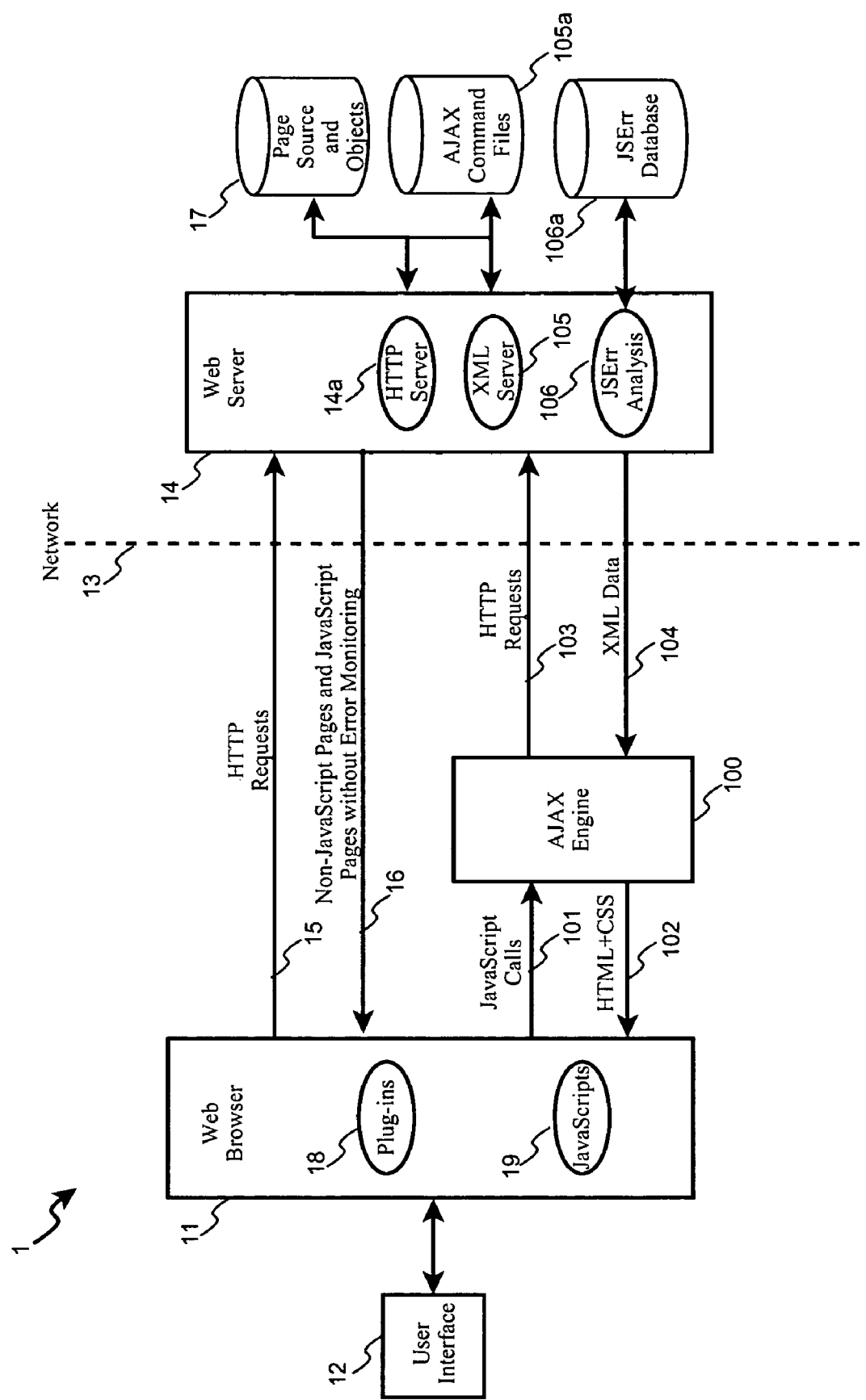
FIG. 1 illustrates the invention from a system perspective.

FIG. 1 illustrates a system view (1) of the invention, including a web browser (11) interconnected to a web server (14) via a network (13), such as a local area network ("LAN"), virtual private network ("VPN"), or the Internet. The web browser, such as Netscape's Navigator™, Opera™, Mozilla™, Firefox™, or Microsoft's Internet Explorer™, employs a user interface (12) to interface to a human user, such as a display, keyboard, mouse, trackpoint, touchscreen, sound card with speakers, etc. The web browser also typically can run one or more extensions, such as web browser plug-ins (18).

The web server typically includes a suite of software for performing Hyper Text Transfer Protocol services (14a), such as an Apache HTTP Server, or IBM's WebSphere™ integrated web server environment. The HTTP server usually responds to various HTTP requests (15) received from the browser by retrieving one or more web pages, such as a Hyper Text Markup Language ("HTML") file, and one or more web objects, such as an image file (e.g. a BMP, JPG, TIF, etc., file), or an audio file (e.g. a WAV file, an MP3 file, etc.), from page storage (17).

AJAX-based Embodiment

The invention preferably utilizes a programming methodology known in the industry as "AJAX", as an unofficial, untrademarked acronym for "Asynchronous JavaScript™ and XML", where "XML" is an acronym for eXtensible Markup Language. As shown in FIG. 1, an AJAX engine (100) is provided to the client system, cooperative with the web browser. The AJAX engine intercepts WBPL (19) calls (101) to the server, and converts those to HTTP requests. An XML server (105), the HTTP server, or both, respond by serving XML data (104) to the AJAX engine, which then delivers corresponding HTML and cascading style sheets ("CSS") to the web browser for display and interpretation. AJAX is an evolving methodology, but much definition has already been accomplished.

AJAX In General. To those skilled in web programming, AJAX is a programming technique that encompasses the use of Java™ technologies, XML, and WBPL for Java-based web applications. AJAX is a method of web development that utilizes client-side scripting to allow data exchange with web servers. By using AJAX, web pages are dynamically updated without a full page refresh interrupting the interaction flow. AJAX is not a single technology or standardized programming language, per se, but rather it is an approach or pattern to identify and describe a useful design technique.

Persons skilled in the art have learned that by using AJAX, users do not need to wait five seconds for a web page to reload every time user clicks on an item, for example, as AJAX enables the browser to respond to the user's input as it is being entered or modified. No longer does it need to have all the information in order to reload the entire page all at once. It really enables web pages to respond in dynamic "real time" by rearranging the pages without completely clearing it with new inputs. In addition, one of AJAX advantages is that it does not require any additional plug-in. It is simply a design style. Because of this feature, it provides users the continuous, real-time responsive feel experience.

Furthermore, as web pages communicate with the web browser, it enables real-time update. This means that only information directly affected will be modified, but not the entire page. AJAX also provides an enhanced user experience in the web world. As a user makes changes on the web page, one can see animation such as text color change to show that information is being saved or static text changed into an editable field as the mouse hovers over a phrase or object. Unlike other techniques, AJAX is neither proprietary nor browser specific. This allows AJAX to be an attractive approach in web development.

Although existing browsers are capable of handling AJAX applications, AJAX has only been gaining popularity recently. Some of the browsers that handle AJAX includes Apple's Safari™, Microsoft's Internet Explorer™, Mozilla's Firefox™, Netscape's Navigator™, Konqueror™, Opera™, and Opera Mobile™ Browser.

Most notably, AJAX has been used by Google™ in its prominent software product such as GMail™ and Google Maps™. Yahoo's Flickr™, America Online's AIM™ Mail, 24SevenOffice™ and Microsoft's Virtual Earth™ also use AJAX.

AJAX is flexible because it uses the world wide web as its basic platform and with its approach in web design, it resolves user frustration to the standard "click and wait" experience. In fact, because of the web's flexibility, it allows multiple access points for users. With better network infrastructure such as broadband access, users expect a more animated web experience using current browser improvements such as XML and CSS. Using these different technologies, developers can easily update applications rather than follow the traditional GUI methodology.

Although AJAX is easy to use by Internet users, it remains challenging for server-side developers. Developers need to understand logical presentations in both the HTML client pages as well as server-side logic in order to generate the XML content needed by the client HTML pages. Furthermore, frameworks are still being developed to support the AJAX interaction models between the client and the server. Currently, the keystone operation of AJAX, the "XMLHttpRequest object", is not part of standardized WBPL specification, so its standardization is still being created. Without it, XMLHttpRequest behavior varies on the client-side depending on development.

AJAX Underlying Technologies and Principles. Because AJAX responds to browser events, Dynamic HTML ("DHTML") is used to allow actions to be triggered by input actions such as a keystroke, data input, or mouse click. JavaScript™ enables optimal dynamic experience while using the Document Object Model ("DOM") to provide display modifications. This entails text or background color change as input is being saved. Using the flexibility of programming techniques, AJAX can link events based on its developed logical workflow.

For example, when a user inputs background information, it triggers the Save_Event to store the data in a datasource, such as a DB2 database, then triggers Color_Change_Event which modifies the input field's color on the browser from black to blue to notify users that the information has been stored. As an AJAX application interacts with backend servers, it is using web remotes with XMLHttpRequest and Frames technologies. XMLHttpRequest was originally implemented by Microsoft as an ActiveX object. Now it is available in Mozilla and Apple's Safari browser's native object which allows WBPL to make HTTP requests to a remote server without the need to reload the web page completely.

This provides the continuous feel to users because no visual interruption occurs as the browser and server communicate. Messages are passed using XML and thus data can be easily manipulated using the XML technology. Using the setTimeout( ) mechanism from WBPL, it can also set actions or events to happen at specified times.

Unique Usage of AJAX in the Invention. AJAX is well-known as a programming technique which improves the responsiveness of a web browser's user interface to real time input and user commands. However, the present invention utilizes AJAX techniques for a different and unique purpose—to establish real time monitoring of WBPL execution conditions by the client device without causing a user interface disruption, such as the posting of a WBPL error message to the user interface. Using the real-time connection between the web browser and the web server via the AJAX engine using XML as the data transfer, the invention provides one or more AJAX command files (105a) to implement the script execution monitoring and error reporting, and a WBPL Error Analyzer (106) with error database, for determining if a client is to be monitored, and if so, what the nature of each error is.

Currently, there is no known discussion in the WBPL or AJAX communities regarding using AJAX in such an error monitoring or reporting role.

Overview of System Logical Process

Upon occurrence of a WBPL error, the invention first determines (31) if the client device is eligible for error reporting and execution environment information collection, as shown in FIG. 3. If the client is not eligible (32), then the WBPL is handled normally (33). However, if it is eligible, details of periodic successful WBPL execution, optional error event, and execution conditions are collected (34), and then they are analyzed (34) to determine the source or trend of the error(s).

Participation Determination

Figure 4:
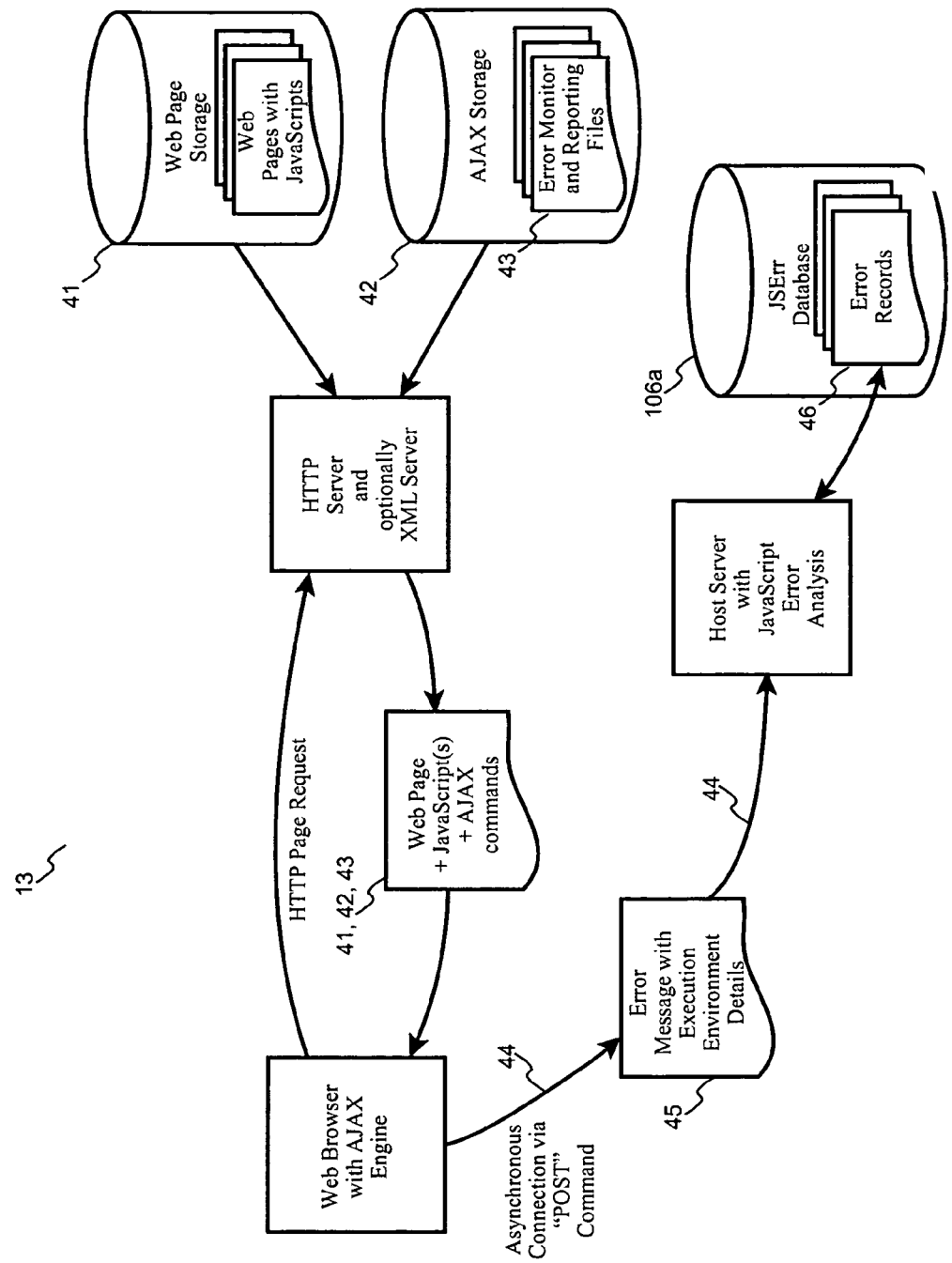
FIG. 4 shows how the invention accomplishes downloading the specific commands to collect WBPL error details via an asynchronous, background channel to a server.

More specifically, the invention determines if a client is eligible to participate in the unobtrusive error information collection process of the invention by following the following steps as illustrated in FIG. 4:
  (a) When a client requests a web page, the page (41) returned by the server is enhanced to include a WBPL (e.g. .js) (42) that contains AJAX commands (43) for accomplishing the monitoring and reporting functions of the invention. The AJAX commands are preferably in a separate .js files so that they can be parsed even if JavaScript in other .js files or in the HTML code cannot.
  (b) The WBPL(s) (41) included with the returned page contains AJAX instructions that create an asynchronous connection (44) to the host server as described in more detail in the following section regarding the method for collecting web usage data.
  (c) When the server receives reporting messages (45) of any information from the AJAX monitoring and reporting functions, it creates a record (46) in an error database (106a), including preferably a session identifier.

At this point, it has been determined that the client is eligible to participate in WBPL Error Determination Reporting.

Non-Obtrusive and Reliable Method for Collecting WBPL Error Condition Details

The present invention utilizes a non-obtrusive and reliable method for sending data to a web server, as an underlying technology to collect WBPL execution error information. There are currently no known methods for automated collection and reporting of WBPL errors.

Generally, our method to collect and report this information works as follows:
  (a) any page that includes WBPL code that needs to be monitored for WBPL errors references special JavaScript to handle that task, preferably in a separate .js file;
  (b) the WBPL, using asynchronous communication methods, creates an initial connection and sends browser information back to the web server, or the browser information can be sent at later times;
  (c) the monitored WBPL includes commands to request the special WBPL send success status periodically, as often and wherever is desired by the owner of the web page, as the monitored WBPL executes; and
  (d) if an error occurs while parsing the monitored WBPL, the error is not displayed to the end user, and the web server calculates a probable error by the absence of a success status reported. While the absence of an individual success status may simply mean communication was suddenly interrupted within the milliseconds, the aggregated data across multiple users will be the deciding factor that there is indeed a WBPL error being experienced. Furthermore, if the web browser supports the onError method, this method may be used to send that an error has occurred, which confirms the lack of an expected success message.

The asynchronous connection utilized to the web server only minimally affects page load time. This type of connection is referred to as "XMLHTTP" in Internet Explorer, while it is referred to as XMLHttpRequest by Mozilla™, Firefox™, and Netscape™ browsers. We will refer to them, and utilize them, interchangeably.

Figure 5:
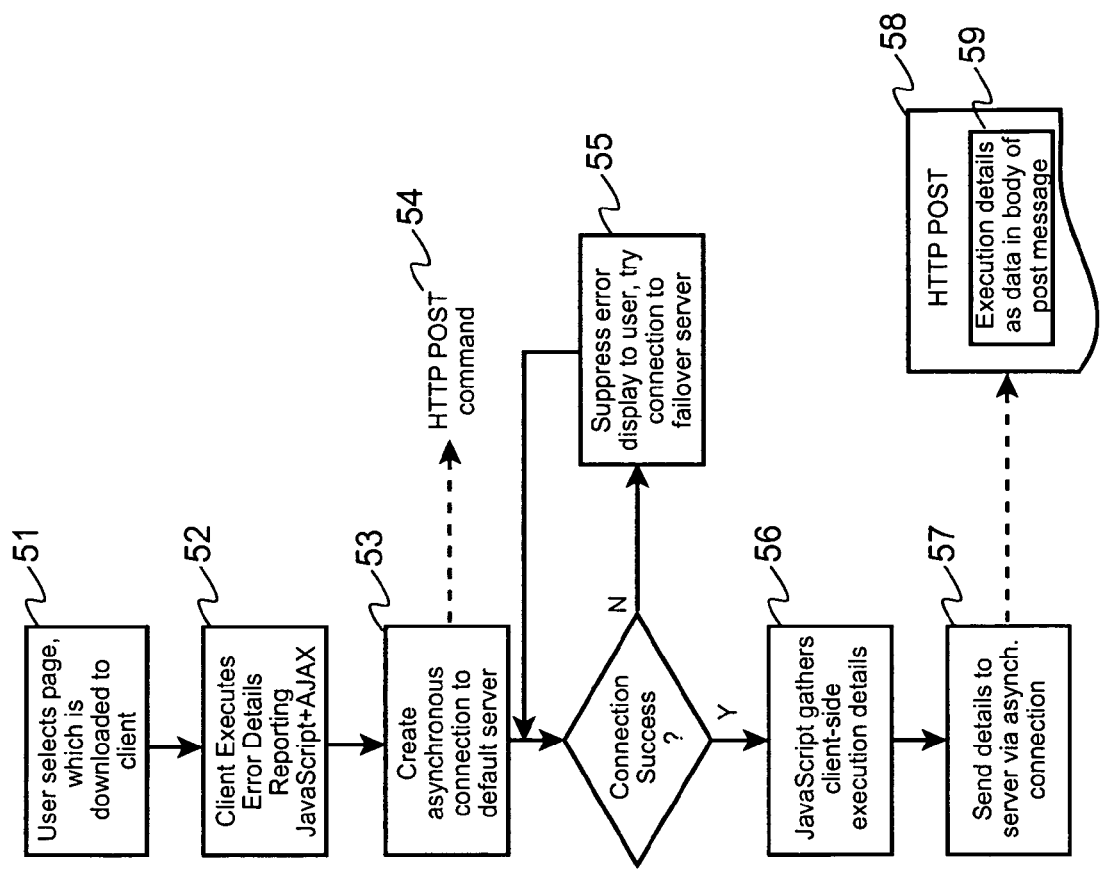
FIG. 5 sets forth a logical process according to the present invention to accomplish the results as shown in FIG. 4.

Turning to FIG. 5, when a user downloads (51) a web page, their browser processes the included WBPL (52) on that web page. The WBPL instructs their client to create (53) an asynchronous connection to the error reporting server. The operation on that connection is an HTTP "POST" request (54). This HTTP method is used to prevent the caching of the request at intermediate proxies or caching devices. If an error occurs (55) contacting the error reporting server, it is not shown to the end user because the process cannot continue.

Optional environment information is preferably sent along with the initial connection, or optionally at any point in execution such as with the first success status message, with any error message (if the onError method is supported), or at any other time.

Then, success status messages are periodically requested to be sent by the monitored WBPL, which the error reporting WBPL executes by using the HTTP "POST" request's (58) content body (59).

Further, if the onError command is supported by the browser, any error data is collected (56) by the WBPL and sent (57) as the HTTP "POST" request's (58) content body (59).

Error Determination

Next, it is determined if a WBPL error has been encountered by the absence of an expected WBPL success status message, or, if the onError method is supported, by the presence of an error message. Browser data, which is preferably sent before any success or error messages, which can be collected from the client device include, but are not limited to IP address, user-agent, time from initial page request to report received, appName (name of the browser, which is built into the DOM and is more reliable than user-agent), computing platform (e.g., PC, Mac™, Palm™, Windows™, LINUX™, etc.), systemLanguage, cookieEnabled, cpuClass, javaEnabled, screen height and width (if doing anything with window resize).

Figure 6:
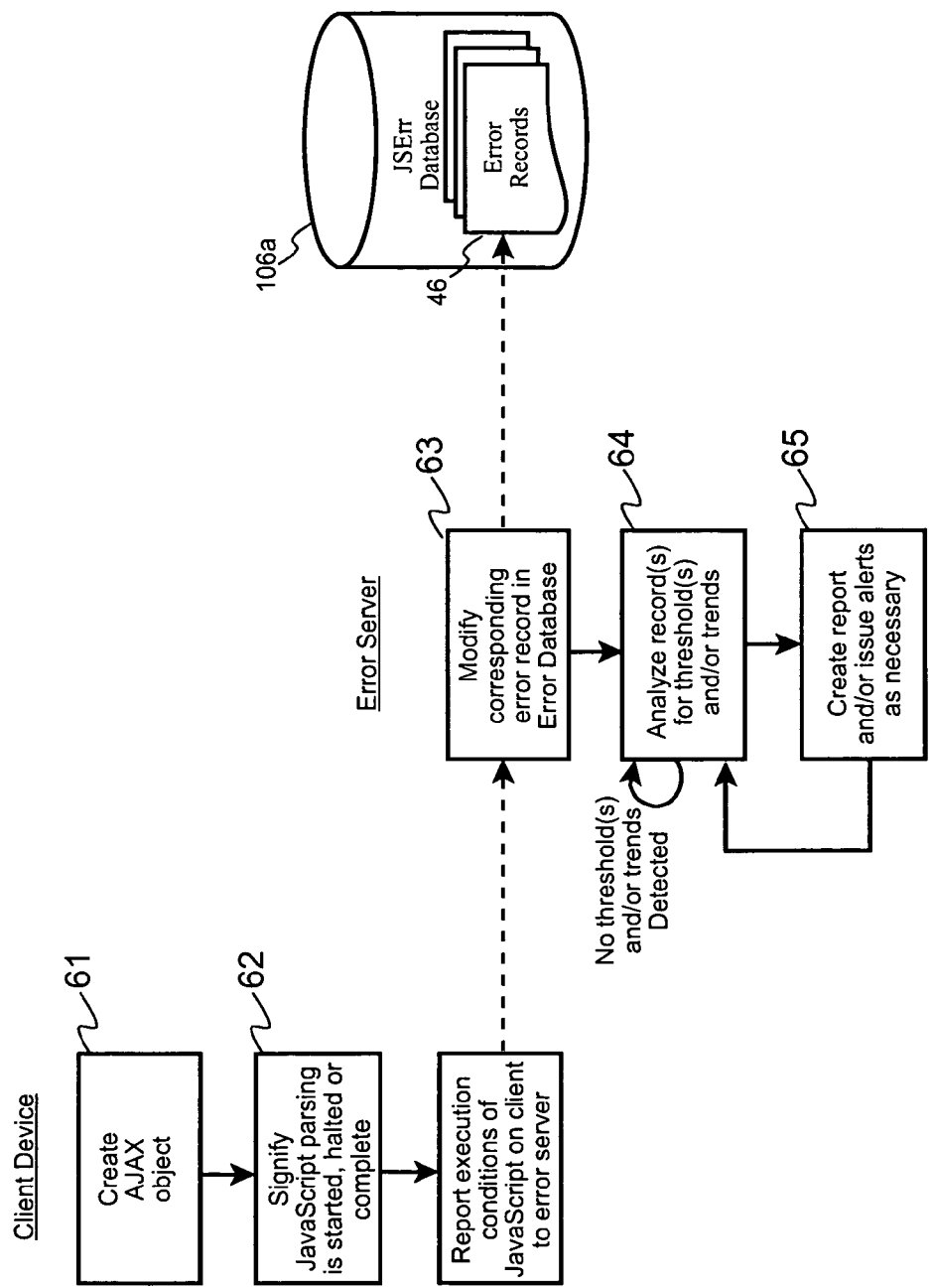
FIG. 6 depicts a logical process for determining if an error has been detected on a client device, and if so, the generation of a report or alert, appropriately.

In order to accomplish this, the logical process of the invention performs the following operations or steps, as shown in FIG. 6:
  (a) upon execution by the client, the AJAX script creates (61) an object, such as "ajax";
  (b) when the WBPL code in question is finished, or at the beginning or anytime in-between, it calls a command to signify (62) the code has parsed, such as "ajax.javascriptComplete(id)";
  (c) upon calling this signification command, the database record created during the Participation Determination method, previously described, is modified (63) in any combination of the following ways, depending on desired outcome:
    1. Set a Boolean that the WBPL was successful.
    2. Set a timestamp to serve the same purpose plus measure performance.
    3. Set more detailed information such as function name or line number to help pinpoint where failures occur.
    4. Delete the record if we only care about failed parsing.
    5. Increment another table that aggregates success, failures, and/or performance information, especially by browser type.
  (d) periodically or continuously, the error analysis program running on the web server or error reporting server loops through the table updated by the Participation Determination method and the Error Determination method to determine (64) if failures have occurred, searching for the following information:
    1. Does the record have the desired completion status, be that a timestamp, Boolean flag, or other indicator? If yes, process record as a success (aggregate data to another table and delete, or other similar method). If no, continue.
    2. Compute the difference between the current time from the timestamp of the initial record insert. Does the difference exceed a threshold we set? This threshold would be set based on minimum expected performance levels after initial record insert, which, even on very slow machines and network latency, would be very small number, for example. The threshold can be set to a relatively large number, with the balance being the larger the number, the more times a record may be parsed in future loops. If the difference exceeds the threshold, then the record is processed as a failure, otherwise, the process continues.
  (e) A report is generated (65), and/or alerts are issued based on thresholds such as number of failed WBPL users, or of a certain browser type, based optionally on aggregated data across multiple users or clients, or based on data collected from only a particular user or client device.

This process can be applied to page loads, as well as to ongoing WBPL invocation, such as mouse/keyboard events.

Suitable Computing Platform

The invention is preferably realized as a feature or addition to the software already found present on well-known computing platforms such as embedded microcontrollers, but potentially on personal computers, laptop computers, tablet computers, notebook computers, personal digital assistants ("PDA"), web-enabled wireless telephones, and other types of personal information management ("PIM") devices, as well.

Therefore, it is useful to review a generalized architecture of a computing platform which may span the range of implementation, from a high-end web or enterprise server platform, to a personal computer, to a portable PDA or web-enabled wireless phone.

Figure 2A:
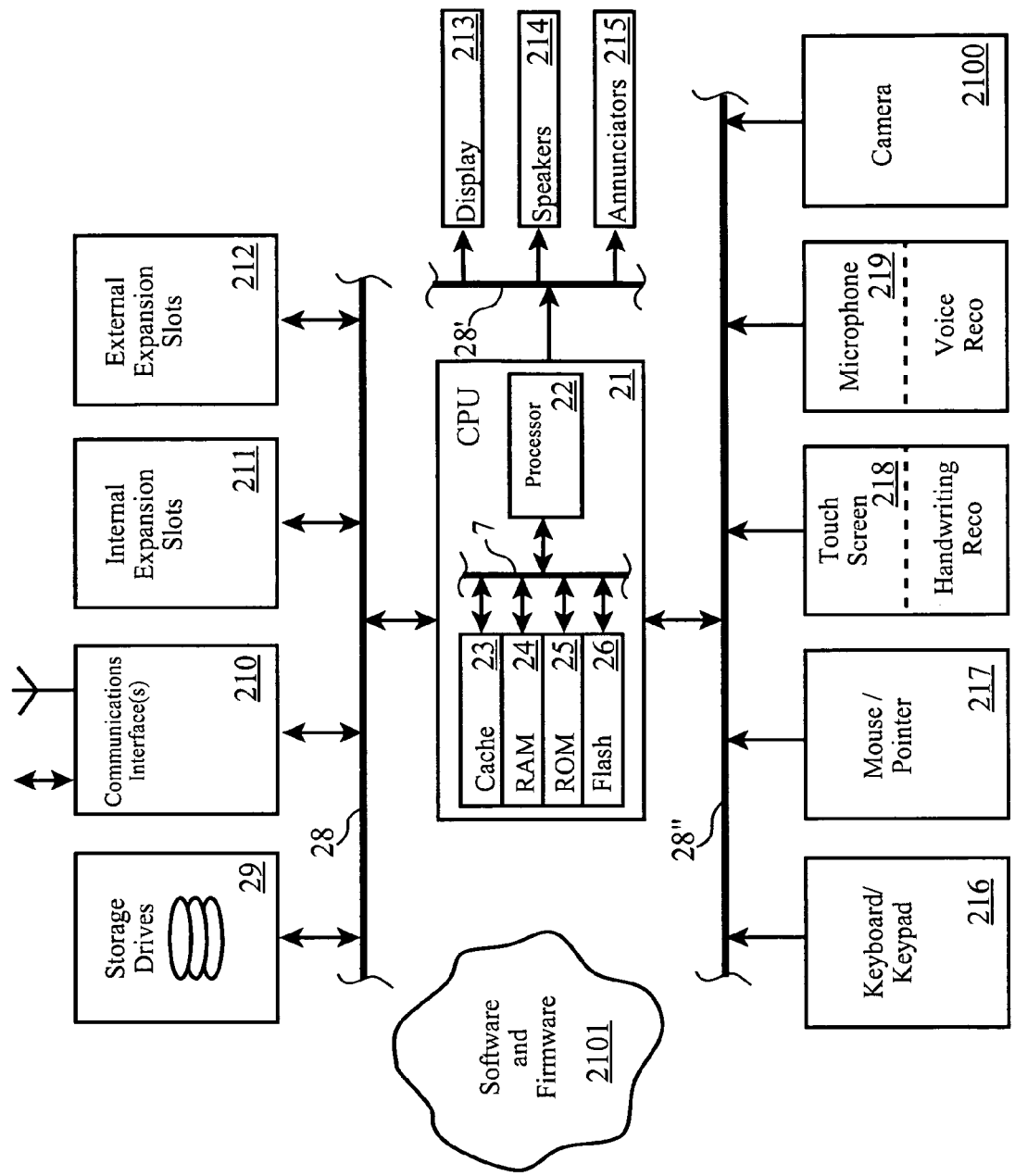
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
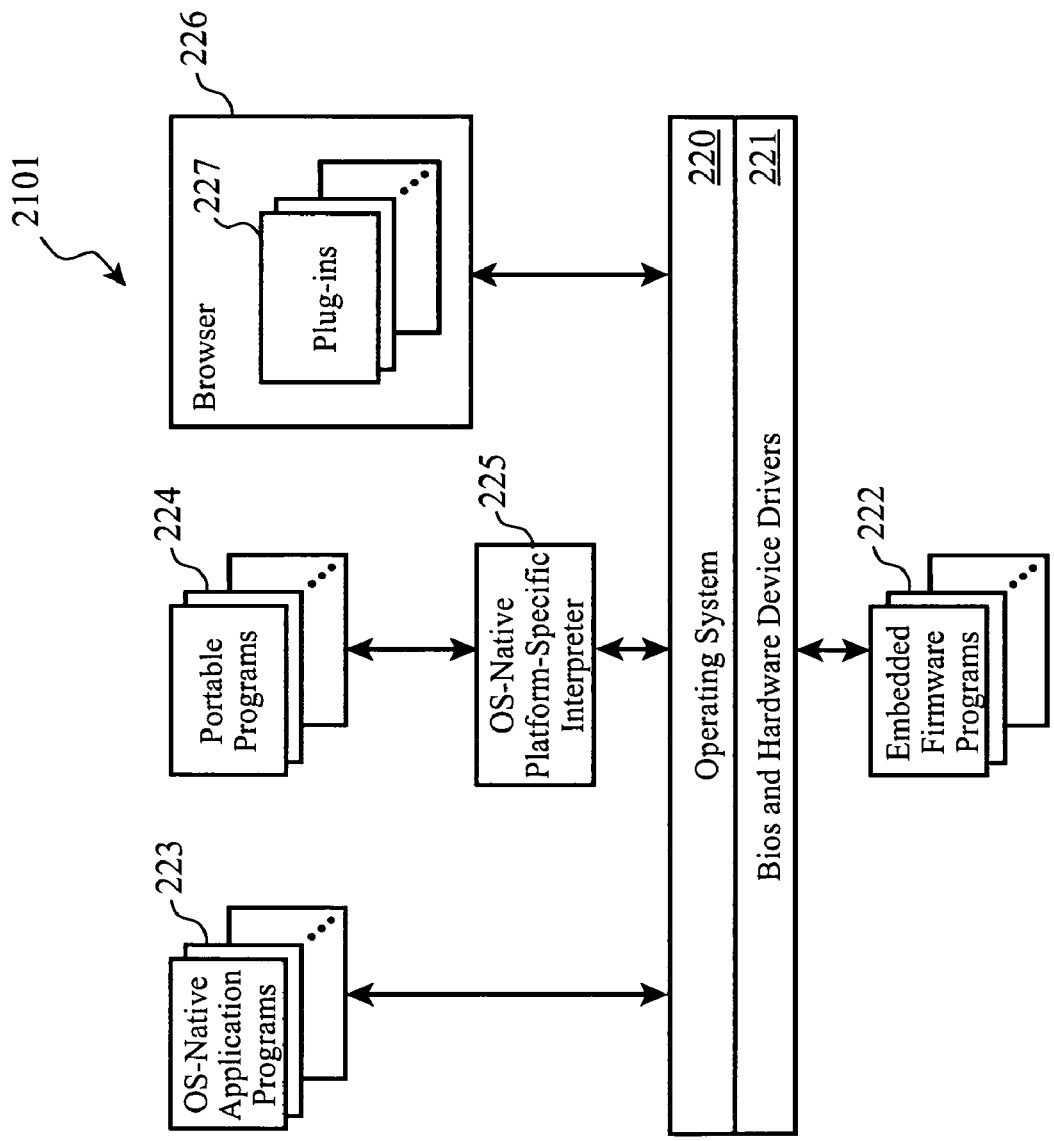

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Conclusion

As certain example embodiments have been used to illustrate the invention, it will be readily recognized by those skilled in the art that these do not represent the limits of the invention. For example, alternate programming methodologies, computing platforms, communication protocols, and networking technologies can be employed without departing from the spirit of the invention. For these reasons, the scope of the present invention should be determined by the following claims.

What is claimed is:

1. A system comprising:
a hardware means for performing a logical process, said logical process including a web browser logical process;
one or more web pages transmitted from a web page server to said web browser, said pages including at least two web browser-based programming language scripts and one or more AJAX-technique web page update commands, at least one of said web browser-based programming language script and AJAX-technique web page update commands monitoring and collecting web browser-based programming language script error conditions, and said AJAX-technique web page update commands comprising client-side scripting for data exchange between a web-browser and a server dynamically update said web pages without interruption of interaction flow caused by a full page refresh action;
an AJAX engine portion of said web browser executing said AJAX-technique web page update commands to intercept web browser-based programming language script calls to said server, converting said calls to Hyper Text Transfer Protocol requests, receiving extensible markup language data from said server, and delivering corresponding web page and cascading style sheets to said web browser for display and interpretation;
a background channel asynchronous connection established by said AJAX engine and AJAX-technique web page update commands between said web browser and an error processing server; and
a non-cacheable error details message produced by said monitoring and collecting of web browser-based programming language script error conditions, and sent by said monitoring and collecting web browser-based programming language script to said error processing server via said asynchronous connection.

2. The system as set forth in claim 1 wherein said non-cacheable error details message comprises a Hyper Text Transfer Protocol POST message having one or more JavaScript error details in a body portion of said POST message.

3. The system as set forth in claim 1 wherein said error details message comprises one or more client-side execution details selected from a group consisting of an Internet Protocol address, a user-agent indication, a time from initial page request to a time or report received, an document object model name of the browser which was executing said JavaScript, a computing platform indicator, an operating system indicator, a system language indicator, a cookie enablement indicator, a processor class indicator, a Java enablement indicator, and a display size indicator.

4. The system as set forth in claim 1 further comprising one or more AJAX command files which are stored separately from said web pages by said web page server.

5. The system as set forth in claim 1 wherein said error server further comprises one or more records of details received in said message, said records including one or more data records selected from a group consisting of a Boolean flag indicating that said script was successful, a timestamp, a function name indicating where a script error occurred, a line number indicating where a script error occurred, a success aggregation by script identifier, a failure aggregation by script identifier, a success aggregation by user identifier, a failure aggregation by user identifier, a success aggregation by computing platform identifier, a failure aggregation by computing platform identifier, a success aggregation by web browser identifier, a failure aggregation by operating system identifier, a success aggregation by user identifier, and a failure aggregation by operating system identifier.

6. The system as set forth in claim 5 further comprising an error threshold and trend analyzer reviewing said details records, determining that one or more thresholds or one or more trends are present in said details, and, responsive to said determination, producing one or more results selected from a group consisting of an error report and an error alert.

7. A method comprising:
transmitting one or more web pages from a web page server computing platform to a web browser computing platform, said web pages including at least two web browser-based programming language scripts and one or more AJAX-technique web page update commands, at least one of said web browser-based programming language scripts and AJAX-technique web page update commands monitoring and collecting web browser-based programming language script error conditions, and said AJAX-technique web page update commands comprising client-side scripting for data exchange between a web-browser and a server dynamically updating said web pages updated without interruption of interaction flow caused by a full page refresh action;
executing by an AJAX engine portion of said web browser computing platform configured said AJAX-technique commands by:
intercepting calls by said web browser-based programming language script to said web page_server computing platform,
converting said calls to Hyper Text Transfer Protocol requests,
receiving extensible markup language data from said web page server computing platform, and
delivering corresponding web page and cascading style sheets to said web browser for display and interpretation;
establishing a background channel asynchronous connection by said AJAX engine portion between said web browser computing platform and an error processing server computer platform, and
providing a non-cacheable error details message produced by said monitoring and collecting web browser-based programming language script error conditions, and sent to said error processing server computing platform via said asynchronous connection.

8. The method as set forth in claim 7 wherein said non-cacheable error details message comprises a Hyper Text Transfer Protocol POST message having one or more JavaScript error details in a body portion of said POST message.

9. The method as set forth in claim 7 wherein said error details message comprises one or more client-side execution details selected from a group consisting of an Internet Protocol address, a user-agent indication, a time from initial page request to a time or report received, an document object model name of the browser which was executing said JavaScript, a computing platform indicator, an operating system indicator, a system language indicator, a cookie enablement indicator, a processor class indicator, a Java enablement indicator, and a display size indicator.

10. The method as set forth in claim 7 further comprising storing by said web page server one or more AJAX command files separately from said web pages.

11. The method as set forth in claim 7 wherein said error server further comprises one or more records of details received in said message, said records including one or more data records selected from a group consisting of a Boolean flag indicating that said script was successful, a timestamp, a function name indicating where a script error occurred, a line number indicating where a script error occurred, a success aggregation by script identifier, a failure aggregation by script identifier, a success aggregation by user identifier, a failure aggregation by user identifier, a success aggregation by computing platform identifier, a failure aggregation by computing platform identifier, a success aggregation by web browser identifier, a failure aggregation by operating system identifier, a success aggregation by user identifier, and a failure aggregation by operating system identifier.

12. The method as set forth in claim 11 further comprising analyzing error thresholds and trends by reviewing said details records, determining if one or more thresholds or one or more trends are present in said details, and producing one or more results selected from a group consisting of an error report and an error alert.

13. A computer readable storage memory comprising: a computer readable storage memory suitable for encoding computer programs; and one or more computer programs encoded by said computer readable storage memory causing a processor and configured to:
   transmit one or more web pages from a web page server computing platform to a web browser, said web pages including at least two web browser-based programming language scripts and one or more AJAX-technique web page update commands, at least one of said web browser-based programming language scripts and AJAX-technique web page update commands monitoring and collecting web browser-based programming language script error conditions, said AJAX-technique web page update commands comprising client-side scripting for data exchange between a web-browser and a server wherein web pages are dynamically updated without interruption of interaction flow caused by a full page refresh action;
   execute by an AJAX engine portion of said web browser computing platform configured said AJAX technique commands by:
      intercepting calls by said web browser-based programming language script to said web page_server computing platform,
      converting said calls to Hyper Text Transfer Protocol requests,
      receiving extensible markup language data from said web page server computing platform, and
      delivering corresponding web page and cascading style sheets to said web browser for display and interpretation;
   establish a background channel asynchronous connection by said AJAX engine portion between said web browser computing platform and an error processing server computing platform; and
   provide a non-cacheable error details message produced by said monitoring and collecting web browser-based programming language script error conditions, and sent to said error processing server computing platform via said asynchronous connection.

14. The computer memory as set forth in claim 13 wherein said non-cacheable error details message comprises a Hyper Text Transfer Protocol POST message having one or more JavaScript error details in a body portion of said POST message.

15. The computer memory as set forth in claim 13 wherein said error details message comprises one or more client-side execution details selected from a group consisting of an Internet Protocol address, a user-agent indication, a time from initial page request to a time or report received, an document object model name of the browser which was executing said JavaScript, a computing platform indicator, an operating system indicator, a system language indicator, a cookie enablement indicator, a processor class indicator, a Java enablement indicator, and a display size indicator.

16. The computer memory as set forth in claim 13 further comprising computer program storing by said web page server computing platform one or more AJAX-technique web page update command files separately from said web pages.

17. The computer memory as set forth in claim 13 wherein said error server further comprises one or more records of details received in said message, said records including one or more data records selected from a group consisting of a Boolean flag indicating that said script was successful, a timestamp, a function name indicating where a script error occurred, a line number indicating where a script error occurred, a success aggregation by script identifier, a failure aggregation by script identifier, a success aggregation by user identifier, a failure aggregation by user identifier, a success aggregation by computing platform identifier, a failure aggregation by computing platform identifier, a success aggregation by web browser identifier, a failure aggregation by operating system identifier, a success aggregation by user identifier, and a failure aggregation by operating system identifier.

18. The computer memory as set forth in claim 13 further comprising computer program analyzing error thresholds and trends by reviewing said details records, determining that one or more thresholds or one or more trends are present in said details, and, responsive to said determining, producing one or more results selected from a group consisting of an error report and an error alert.

\* \* \* \* \*